United States Patent
Lancaster et al.

(10) Patent No.: US 9,588,611 B2
(45) Date of Patent: Mar. 7, 2017

(54) SYSTEM AND METHOD FOR GUARDING EMERGENCY AND CRITICAL TOUCH TARGETS

(71) Applicant: HONEYWELL INTERNATIONAL INC., Morristown, NJ (US)

(72) Inventors: Jeff Lancaster, Cumming, IA (US); Robert E. De Mers, Nowthen, MN (US); Sonia R. Dodd, Phoenix, AZ (US); Erik T. Nelson, Eden Prairie, MN (US); Jessamy Almquist, Golden Valley, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 25 days.

(21) Appl. No.: 14/599,708

(22) Filed: Jan. 19, 2015

(65) Prior Publication Data
US 2016/0209969 A1 Jul. 21, 2016

(51) Int. Cl.
*G06F 3/041* (2006.01)
*G06F 3/0488* (2013.01)
*G06F 3/0484* (2013.01)

(52) U.S. Cl.
CPC .......... *G06F 3/0412* (2013.01); *G06F 3/0488* (2013.01); *G06F 3/04842* (2013.01); *G06F 2203/04104* (2013.01)

(58) Field of Classification Search
CPC ................. G06F 3/0412; G06F 3/0488; G06F 2203/04104; G06F 2203/04108; G06F 3/041–3/047
USPC ......... 345/173–178; 178/18.01–18.09, 18.11
See application file for complete search history.

(56) References Cited

U.S. PATENT DOCUMENTS

| | | |
|---|---|---|
| 8,330,732 B2 | 12/2012 | Nutaro et al. |
| 8,766,936 B2 | 7/2014 | Kawalkar |
| 8,818,624 B2 | 8/2014 | Small et al. |
| 2011/0187651 A1 | 8/2011 | Whitlow et al. |
| 2011/0260829 A1* | 10/2011 | Lee ........................ G06F 3/0414 340/5.51 |
| 2013/0082974 A1* | 4/2013 | Kerr ..................... G06F 21/6245 345/174 |
| 2013/0100043 A1 | 4/2013 | Kolbe |
| 2014/0043241 A1 | 2/2014 | Sukumar |
| 2014/0123078 A1* | 5/2014 | Brinda .................... G06F 21/36 715/863 |
| 2014/0232679 A1 | 8/2014 | Whitman et al. |

(Continued)

FOREIGN PATENT DOCUMENTS

| | | |
|---|---|---|
| EP | 0043201 A1 | 1/1982 |
| EP | 2690514 A2 | 1/2014 |
| WO | 2014075121 A1 | 5/2014 |

OTHER PUBLICATIONS

Alapetite, A., et al.; A Deported View Concept for Touch Interaction, ACHI 2013 : The Sixth International Conference on Advances in Computer-Human Interactions; Copyright (c) IARIA, 2013. ISBN: 978-1-61208-250-9.

(Continued)

*Primary Examiner* — Stephen Sherman
(74) *Attorney, Agent, or Firm* — Lorenz & Kopf, LLP (57) ABSTRACT

A touch screen system and method that (1) renders a critical button in a visually distinguishable manner and (2) provides an intuitive multi-step activation process that effectively guards the button from unintentional activation is provided.

18 Claims, 10 Drawing Sheets

(56) References Cited

U.S. PATENT DOCUMENTS

2014/0300555 A1    10/2014   Rogers
2014/0368469 A1*   12/2014   Tokutake ................ G06F 3/044
                                                                                                  345/174

OTHER PUBLICATIONS

Voelker, S., et al.; An Evaluation of State Switching Methods for Indirect Touch Systems, Session: Tables and Floors CHI 2013: Changing Perspectives, Paris, France, 2013.
Sorrill, S.L.; What Safety Initiatives Have Been Introduced in Response to; Southern Illinois University Carbondale Open SIUC, 2013.
Thurber, M.; Garmin G5000 Adds Vision to Learjet Cockpit, Business Aviation, Oct. 3, 2012.
Extended EP Search Report for Application No. 15194178.8-1507 dated Nov. 5, 2011.

* cited by examiner

SYSTEM AND METHOD FOR GUARDING EMERGENCY AND CRITICAL TOUCH TARGETS

STATEMENT REGARDING FEDERALLY SPONSORED RESEARCH OR DEVELOPMENT

This invention was made with Government support under Agreement No. DTFAWA-10-A-80031 awarded by the FAA. The Government may have certain rights in this invention.

TECHNICAL FIELD

Embodiments of the subject matter described herein relate generally to touch screen display systems and, more particularly, to integrating emergency and/or critical touch targets into touch screen display systems.

BACKGROUND

Touch screen display systems, or "touch screens," are increasingly relied upon as user input devices because they offer a variety of benefits. One benefit is a reduction in space; generally, a series of separate mechanical buttons or switches takes up more space than the same number of touch targets, or buttons, when consolidated into a touch screen display system. The reduced space results in a minimization of the scan area that a user must view to locate buttons, which, in turn, decreases the user's cognitive workload. Employing a touch screen display system also typically reduces the number of parts and the assembly time for a given design. Accordingly, user interface designs increasingly rely on touch screen display systems.

In spite of the significant benefits provided by touch screen display systems, emergency and/or critical touch targets (hereinafter referred to as critical buttons) continue to be implemented as mechanical levers or switches to address several concerns. A first concern driving the separate mechanical implementation of a critical button is that it must be quickly and intuitively recognized as a critical button in the context of the application, and with respect to all non-critical buttons available to the user. In practice, the critical button is typically distinguished using visually distinguishing colors, a unique design, a unique location, and may even have a cover placed over it.

Another concern driving the separate mechanical implementation of critical buttons is the need to guard them from unintentional activation. Guarding is generally accomplished by implementing a multi-step process, wherein two or more steps are required to achieve activation of the critical button. In practice, the first step may be flipping open or breaking a cover, and the second step may be manipulating the underlying mechanical lever or switch. It is readily apparent, therefore, that integrating critical buttons into touch screen display systems requires assuring that a user recognizes the critical nature of a critical button and providing a reliable guarding procedure that prevents unintentional activation of the critical button.

Accordingly, a touch screen display system and method that (1) renders a critical button in a visually distinguishable manner, and (2) provides an intuitive multi-step activation process that effectively guards the critical button from unintentional activation is desirable.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

In accordance with the above, a method for displaying a plurality of buttons on a touch screen device configured to sense touch input is provided. The method comprises displaying, using a first design, non-critical buttons; displaying, using a second design that is different than the first design, a critical button; sensing a first touch input associated with the critical button and a second touch input associated with the critical button; processing a combination of the first touch input and second touch input to determine whether a valid activation request for the critical button has been received; and activating the critical button only when it is determined that a valid activation request for the critical button has been received.

A touch screen display system is also provided. The touch screen display system comprises a touch screen device configured to display a plurality of buttons and to sense touch input, and a processor operatively coupled to the touch screen device and adapted to receive activation criteria. The processor is configured to: (i) display, using a first design, non-critical buttons; (ii) display, using a second design that is different than the first design, a critical button; (iii) sense a first touch input associated with the critical button and a second touch input associated with the critical button; (iv) process a combination of the first touch input and second touch input to determine whether a valid activation request for the critical button has been received; and (v) activate the critical button only when it is determined that a valid activation request for the critical button has been received.

Other desirable features will become apparent from the following detailed description and the appended claims, taken in conjunction with the accompanying drawings and background.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals.

The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any touchscreen display system in any application; and, in particular, the system and methods are suitable for aviation and transportation applications. The embodiments of the system and methods described herein represent an intelligent way to: (1) visually distinguish emergency and critical buttons on a touch screen display system; and, (2) provide an intuitive multi-step activation process that effectively guards the emergency and critical buttons from unintentional activation.

Figure 1:
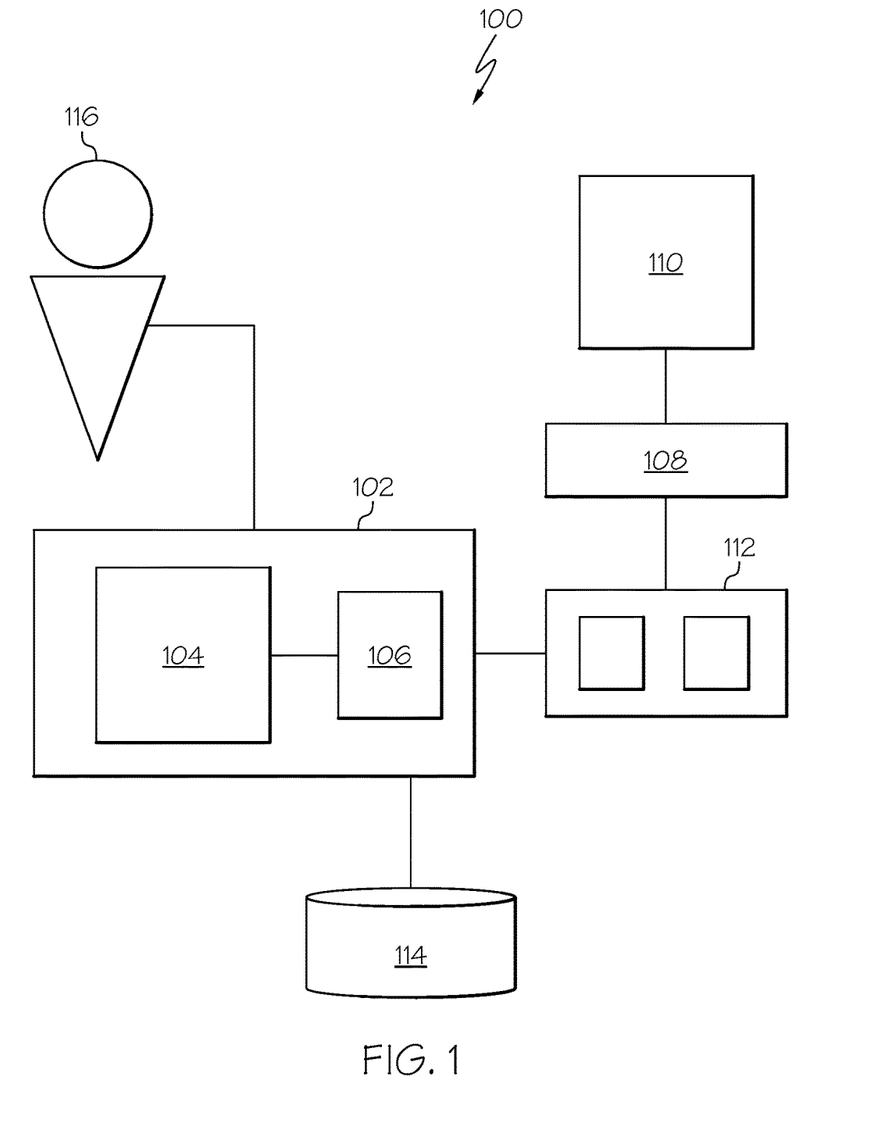
FIG. 1 is functional block diagram illustrating an exemplary embodiment of a touch screen display system employed within a generic display system.

FIG. 1 is functional block diagram illustrating an exemplary embodiment of a touch screen display system 102 employed within a generic display system 100. Touch screen display system 102 includes a touch screen device 104 coupled to a touch processor 106. In FIG. 1, the touch processor 106 is depicted as a separate device, however it may be associated with, or incorporated within, system processor 108, further associating with any suitable number of individual microprocessors, flight control computers, navigational equipment, memories, power supplies, storage devices, interface cards, and other standard components known in the art. As a further example, touch processor 106 may be included within a Flight Management Computer of the type commonly deployed within a Flight Management System (FMS).

The touch screen display system 102 is typically part of a generic display system 100 that includes a system processor 108, a monitor 110, and memory 112, each of which is operatively coupled to system processor 108. In some embodiments, the touch screen display system is implemented within the monitor 110. During operation of the generic display system 100, system processor 108 generally drives monitor 110 to produce a display that visually provides a composite of information in a two dimensional format, a three dimensional format, or in a hybrid format (e.g., in a picture-in-picture or split screen arrangement). The user 116 may interact with the touch screen display system 102 in response to viewing the touch screen device 104, the monitor 110, or any aural or visual information relevant to the user 116.

A touch screen device 104 may be implemented as a resistive or capacitive touchscreen, a surface acoustic wave (SAW) touchscreen, an infrared touchscreen, or the like. The touch screen device 104 is adapted to display buttons in predetermined locations, designs and patterns, and to sense touch input associated with predetermined locations on its surface. As will be described in more detail hereinbelow, the exemplary embodiment employs various designs to render buttons on the touch screen device 104 in a meaningful and intuitive manner, providing the user with readily ascertainable visual feedback as to whether a button is critical or non-critical, and further, whether a critical button is in the process of being activated.

Touch input is typically provided by the user 116 by placing an appendage, for example, one fingertip on the surface of the touch screen device 104 in a predetermined location or placing two or more fingertips on the touch screen device 104 in a predetermined pattern of locations. However, touch input may also include a fingertip movement along the surface of the touch screen device 104, a predetermined sequence of contacts or "taps" between one or more fingertips and the touch screen device 104 at predetermined locations, and/or be characterized by a duration of contact time between the fingertip(s) and the touch screen device 104. In some embodiments, the user may use another appendage, a stylus or a similar selection device instead of a fingertip to provide touch input.

"Critical" buttons are found in a variety of applications, for example, civilian transportation, aeronautics, aviation, military vehicles, trains, and nuclear processing. Critical buttons are typically employed to provide a double check prior to executing actions that are sensitive, and possibly irreversible, such as, but not limited to: launch, power-off, eject, release a load, remove a shield, and begin a critical timer. Accordingly, "non-critical" buttons control actions that are generally perfunctory, and that typically do not need a double check prior to execution.

The database 114 is typically an external source that stores various types of data, including configuration data and models. In the exemplary embodiment, the configuration data and models include various designs for rendering "critical" and "non-critical" buttons on the touch screen display device, as well as criteria to determine the various steps of a valid activation request, specifically: (1) criteria to determine whether a critical button is selected ("valid select"), and (2) criteria to determine whether a critical button has been confirmed ("valid confirm"). The configuration data and models may also include design modifications for rendering the critical buttons differently at various stages of the activation process. The data in the database 114 can be pre-loaded by external data sources or provided in real-time via a user input device (not shown), and may be uploaded to memory 112 prior to operation.

The touch processor 106 may include or cooperate with an appropriate amount of memory 112 which can be realized as any combination of RAM memory, flash memory, EPROM memory, EEPROM memory, registers, a hard disk, a removable disk, a CD-ROM, or any other form of storage medium known in the art. In this regard, the memory 112 can be coupled to the touch processor 106 such that the touch processor 106 can read information from, and write information to, memory 112. In this respect, the touch processor 106 may include or cooperate with any number of software programs (e.g., avionics display programs) or instructions designed to carry out the various methods, process tasks, calculations, and control/display functions described below. In the alternative, memory 112 may be integral to the touch processor 106. In practice, a functional or logical module/component of the system described here might be realized using program code that is maintained in memory 112, such as configuration data and models that may have been retrieved or uploaded from database 114. Moreover, memory 112 can be used to store any and all data utilized to support the operation of the generic display system 100, as will become apparent from the following description.

In the following, FIGS. 2-20, depict various critical button designs provided by the exemplary embodiment. Non-critical buttons are not depicted, but it is understood that non-critical buttons are rendered in a first design that is visually distinguishable from any and all designs used for critical buttons. The critical button designs provided by the exemplary embodiment are intuitive; some examples recall the mechanical levers or switches that they replace. For example, some embodiments render critical buttons in a design that represents a mechanical lever or switch overlaid with a protective cover, and some designs use red and white barber-pole borders to draw the focus of the eye.

In addition to providing an intuitive visually distinguishable design intended to alert a user that a button is a critical button, the exemplary embodiment provides intuitive visual feedback as to the state of activation of critical buttons. State of activation information is provided to the user by rendering critical buttons in a different predetermined design for each intermediate state of activation. For example, one embodiment visually represents a critical button as having a cover that is removed when the critical button is in the intermediate stage of having been selected. Accordingly, critical button designs are organized into groups, wherein each group has a predetermined sequence of two or more designs that are visually distinguishable from each other and from any non-critical button design employed. As an overview, in each sequence, a design is employed to render the critical button in a "start" state, one or more designs are employed to depict the critical button in an intermediate "selected" state, and another design may be employed to depict the critical button in an "activated" state. Start state designs may include a pattern or symbol indicative of the type of movement or touch required to activate the button (for example, straight or curved arrows to indicate a slide or rotate motion), and these patterns may be present from the beginning or appear after the button is contacted by a finger, stylus or appendage. Further details are provided hereinbelow.

Figure 2:
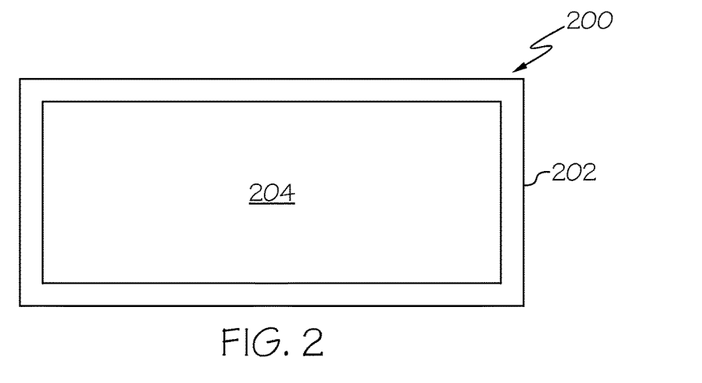
FIG. 2-FIG. 4 illustrate a sequence of designs for displaying a guarded critical button on a touch screen display system in accordance with an exemplary embodiment.
Figure 3:
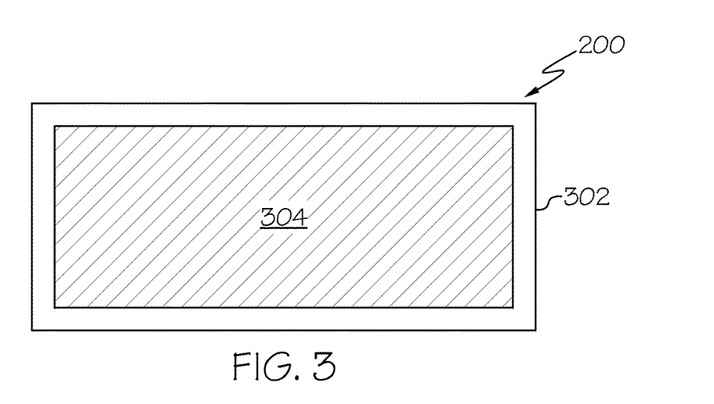
Figure 4:
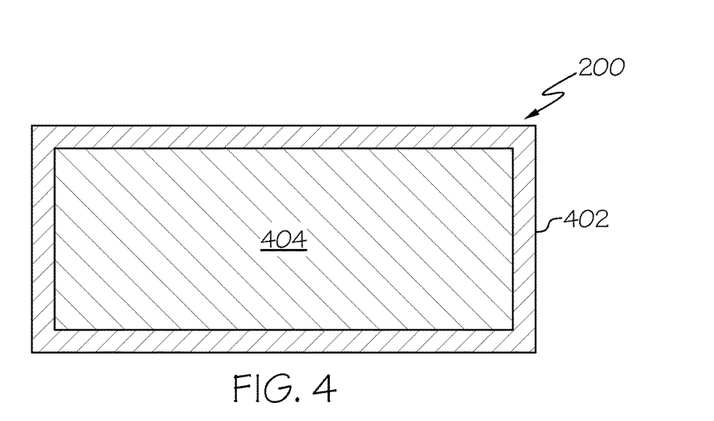

FIG. 2-FIG. 4 illustrate a sequence of designs for displaying a guarded critical button 200 on a touch screen display system 102 in accordance with an exemplary embodiment. Critical button 200 is rendered in a predetermined start state design that depicts the critical button as substantially a rectangle with a border 202 and a fill color 204. The user 116 provides a first touch input to the critical button 200 to select the critical button. If the touch screen display system 102 determines that the first touch input received is valid (i.e., the first touch input meets predetermined "select" criteria), the display of the critical button 200 is modified. Once selected, the design used to render the critical button 200 changes to an intermediate "select" state design, having modifications to the border 302 and/or the fill 304 (FIG. 3). The design of the select state of the critical button is intuitive and visually distinguishable so that the state of the critical button is readily ascertainable to the use as "selected."

In order to activate the selected critical button 200, a valid second touch input must be supplied to critical button 200, typically within a predetermined duration of time. If the touch screen display system 102 determines that the second touch input received meets predetermined "confirm" criteria, the display of the critical button 200 is again modified. Once confirmed, the critical button 200 is activated and rendered with a design that visually distinguishes it as an "activated" critical button, with modifications to the border 402 and/or the fill 404 (FIG. 4). In some embodiments, the second touch must occur when the first touch is still occurring, i.e., the first touch serves to "hold open" the critical button for the second touch.

Figure 5:
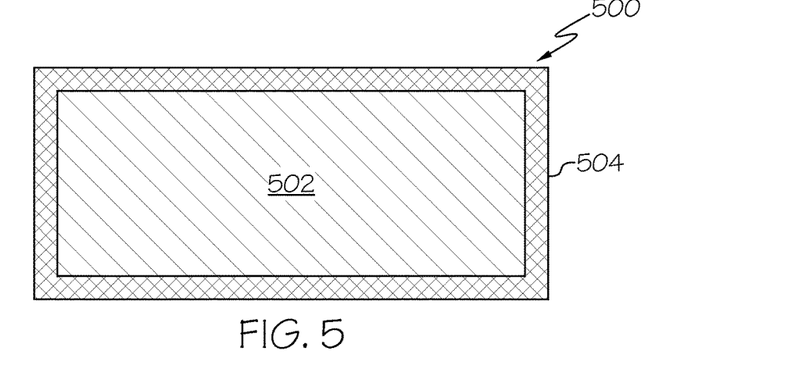
FIG. 5-FIG. 7 illustrate another sequence of designs for displaying a guarded critical button on a touch screen display system in accordance with an exemplary embodiment.
Figure 6:
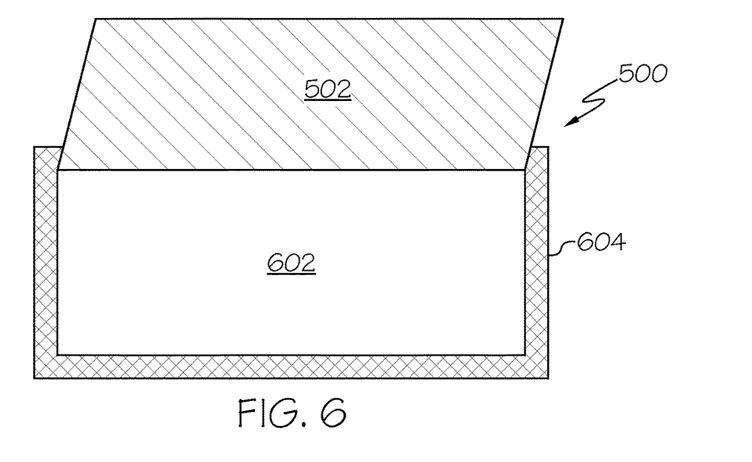
Figure 7:
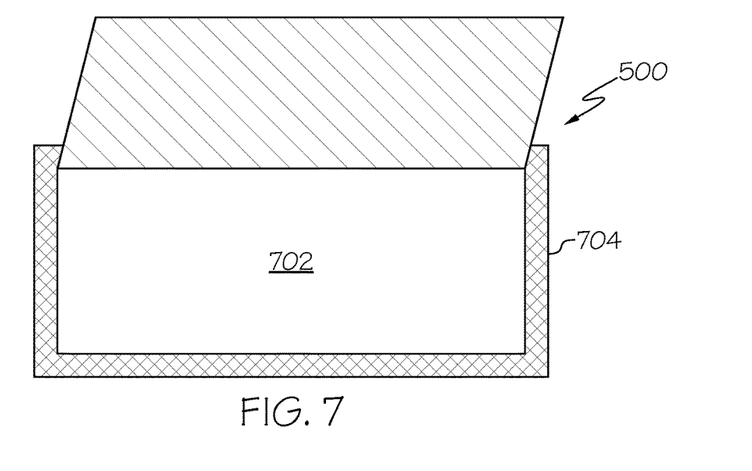

FIG. 5-FIG. 7 illustrate another sequence of designs for displaying a guarded critical button on a touch screen display system 102 in accordance with an exemplary embodiment. Critical button 500 is rendered in a predetermined start state design that depicts the critical button as substantially a rectangle with a barber pole design on the border 504 and an overlaid object 502 (for example, the overlaid object 502 represents a cover on a switch). The user 116 provides a first touch input to the critical button 500 to select the critical button. If the touch screen display system 102 determines that the first touch input received is valid (i.e., the first touch input meets predetermined "select" criteria), the display of the critical button 500 is modified. Once selected, the design used to render the critical button 500 to an intermediate design representing the critical button having the overlaid object "flipped open," and may include modifications to the border 604 and/or the fill 602 (FIG. 6).

In order to activate the selected critical button 500, a valid second touch input must be supplied to critical button 500, typically within a predetermined duration of time. If the touch screen display system 102 determines that the second touch input received meets predetermined "confirm" criteria, the display of the critical button 500 is again modified. Once confirmed, the critical button 500 is activated, and rendered with a design that visually distinguishes it as an "activated" critical button, with additional modifications to the border 704 and/or the fill 702 (FIG. 7).

Figure 8:
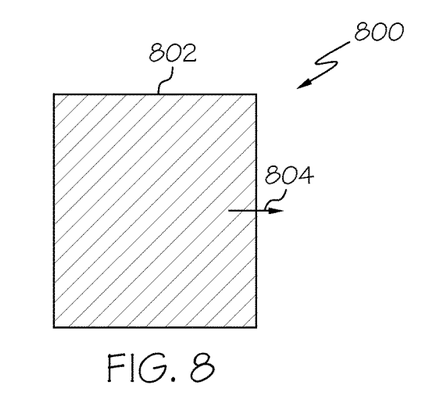
FIG. 8-FIG. 10 illustrate another sequence of designs for displaying a guarded critical button on a touch screen display system in accordance with an exemplary embodiment.
Figure 9:
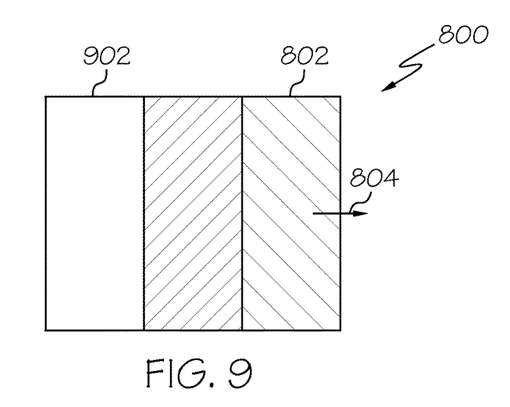
Figure 10:
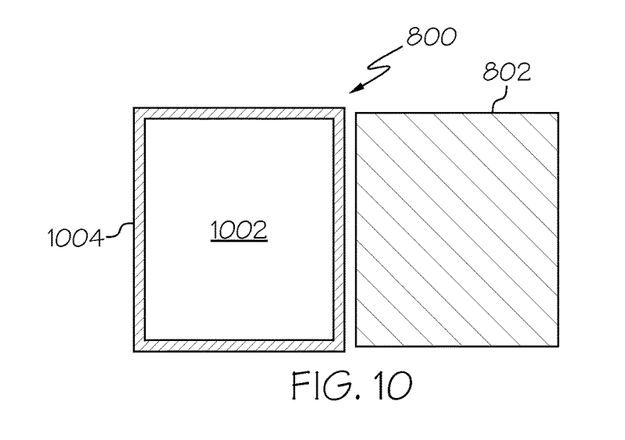
Figure 11:
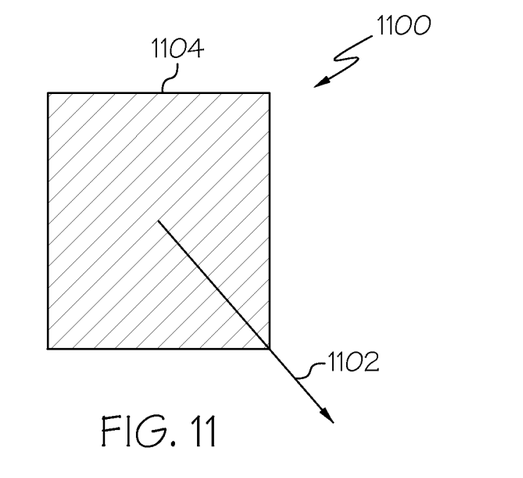
FIG. 11-FIG. 14 illustrate another sequence of designs for displaying a guarded critical button on a touch screen display system in accordance with an exemplary embodiment.

FIG. 8-FIG. 10 illustrate another sequence of designs for displaying a guarded critical button on a touch screen display system 102 in accordance with an exemplary embodiment. Critical button 800 is rendered in a predetermined start state design that depicts the critical button as substantially a square with an overlaid object 802. To select the critical button 500, the user 116 provides a first touch input in the form of a movement depicted by arrow 804. If the touch screen display system 102 determines that the movement of the first touch input received is valid, i.e., the first touch input meets a predetermined "select" criteria (a gesture, in this example), the display of the critical button 800 is modified to represent that the overlaid object 802 was slid off of the critical button (FIG. 9). In FIG. 10, the overlaid object 802 has been slid completely off of critical button 800, indicating that the critical button 800 has been selected. Once selected, the critical button 800 may be rendered with modifications to the border 1004 and/or the fill 1002.

In order to activate selected critical button 800, at least a valid second touch input must be supplied to critical button 800, typically within a predetermined duration of time. The second touch input may be another movement, or one or more fingertip contacts with the touch screen device in one or more predetermined locations. If the touch screen display system 102 determines that the second touch input received meets predetermined "confirm" criteria, the critical button 800 is activated and rendered with a design that visually distinguishes it as an "activated" critical button.

Figure 12:
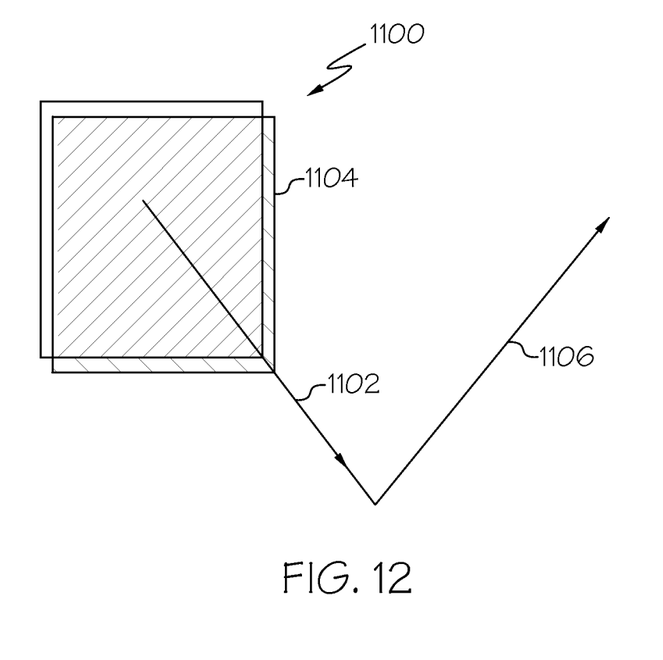
Figure 13:
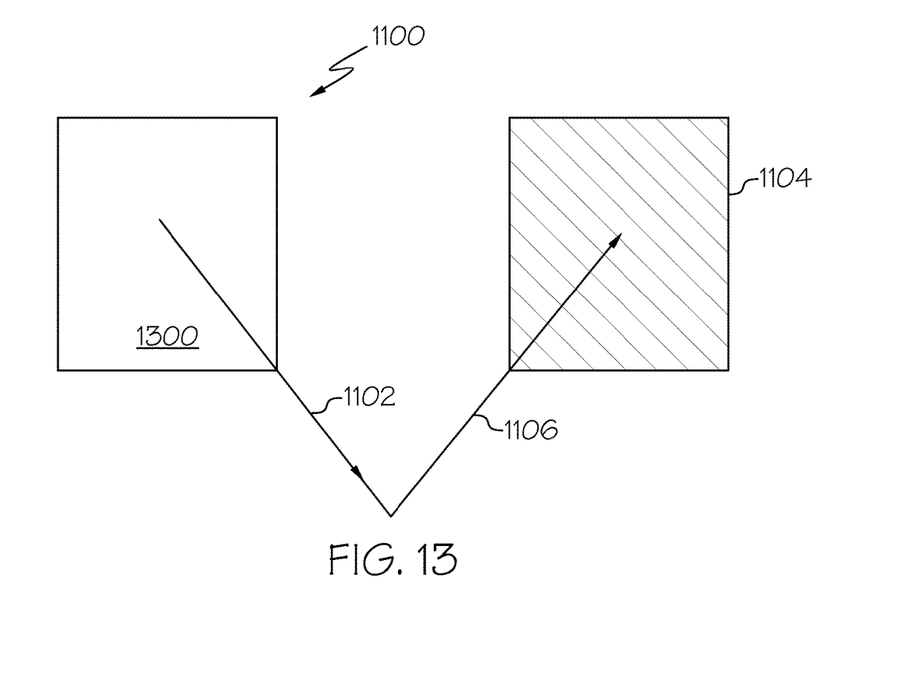
Figure 14:
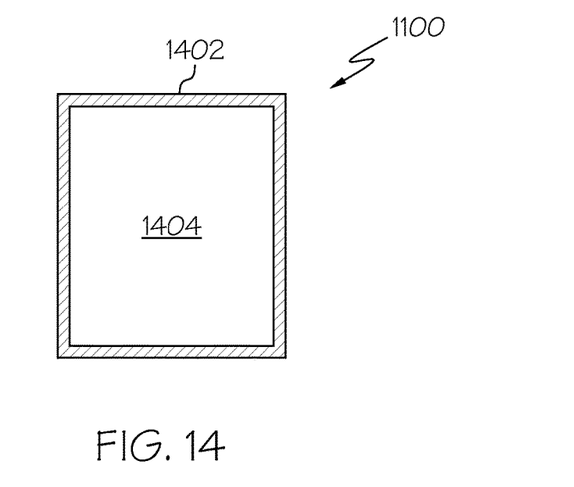
Figure 15:
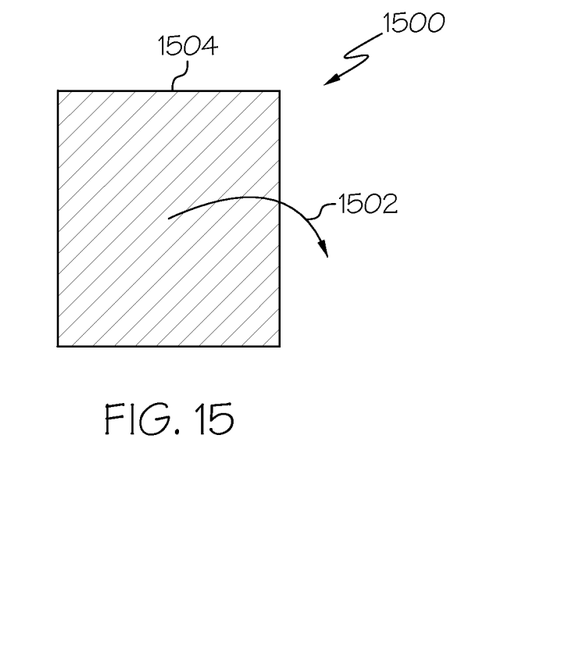
FIG. 15-FIG. 18 illustrate another sequence of designs for displaying a guarded critical button on a touch screen display system in accordance with an exemplary embodiment.

FIG. 11-FIG. 14 illustrate another sequence of designs for displaying a guarded critical button on a touch screen display system 102 in accordance with an exemplary embodiment. Critical button 1100 is rendered in a predetermined start state design that depicts the critical button as substantially a square with an overlaid object 1104. To select the critical button 1100, the user 116 provides a valid first touch input in the form of a movement depicted by arrow 1102. If the touch screen display system 102 determines that the movement of the first touch input received meets a predetermined "select" criteria (a gesture in this example), the display of the critical button 1100 is modified to represent the overlaid object 1104 slid off of the critical button (FIG. 12). In FIG. 12, the overlaid object 1104 has been slid partially off of critical button 1100, and a second touch input, in the form of a movement depicted by arrow 1106 is received. Once selected, the overlaid object 1104 has been completely removed (FIG. 13), and the selected critical button 1100 may be rendered with modifications, such as, to the fill 1300). In some embodiments, the second touch must occur when the first touch is still occurring, i.e., the first touch serves to "hold open" the overlaid object from the critical button in order for the second touch to be valid.

In order to activate selected critical button 1100, a valid second touch input must be supplied to critical button 1100, typically within a predetermined duration of time. The second touch input may be another movement, or one or more fingertip contacts with the touch screen device 104 in a predetermined location. If the touch screen display system 102 determines that the second touch input received is valid, (i.e., the second touch input meets predetermined "confirm" criteria) the critical button is activated and rendered with a design that visually distinguishes it as an "activated" critical button (FIG. 14), having fill 1404 and border 1402.

Figure 16:
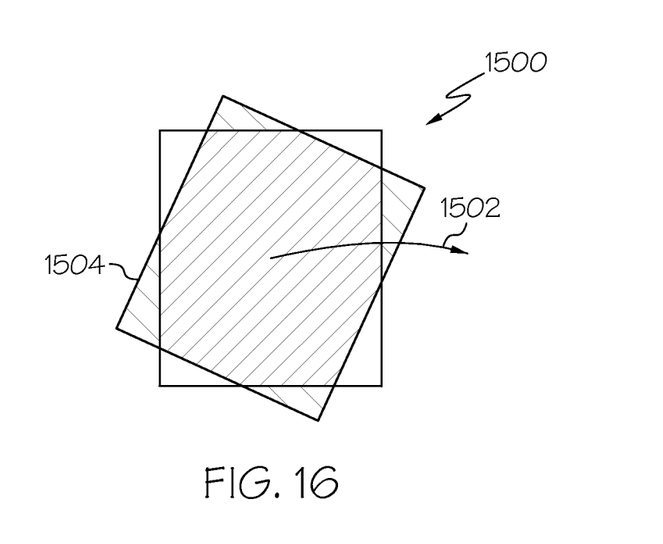
Figure 17:
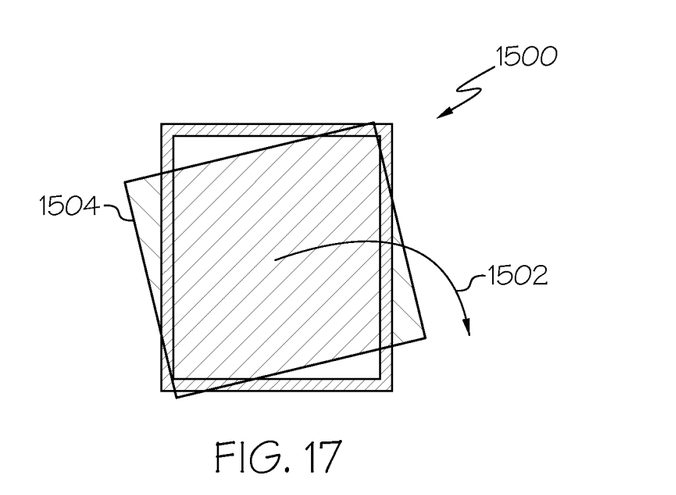
Figure 18:
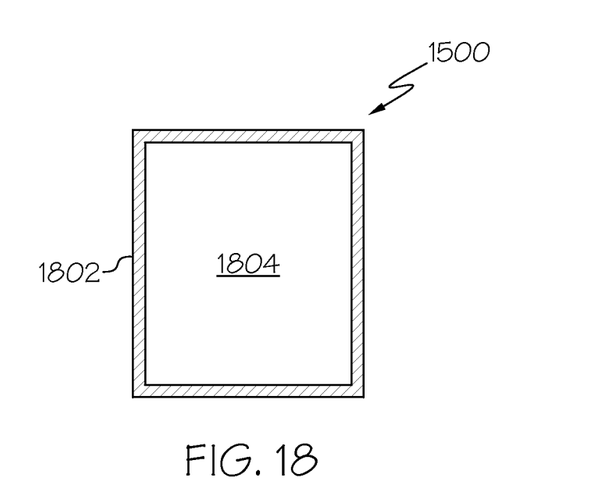

FIG. 15-FIG. 18 illustrate another sequence of designs for displaying a guarded critical button on a touch screen display system 102 in accordance with an exemplary embodiment. Critical button 1500 is rendered in a predetermined start state design that depicts the critical button as substantially a square with an overlaid object 1504. To select the critical button 1100, the user 116 provides a first touch input in the form of a rotational movement depicted by arrow 1502. If the touch screen display system 102 determines that the movement of the first touch input received is valid, i.e., it meets a predetermined "select" criteria (a rotation gesture), the display of the critical button 1500 is modified to represent the overlaid object 1504 rotated on the critical button (FIG. 16 and FIG. 17). In FIG. 18, the overlaid object 1504 has been rotated a predetermined amount, such as by 180 degrees, satisfying the select criteria in this example. Once selected, the overlaid object 1504 appears to change color and the selected critical button 1500 may be rendered with modifications to the fill 1804 and/or the border 1802.

In order to activate selected critical button 1500, at least a valid second touch input must be supplied to critical button 1500, typically within a predetermined duration of time. The second touch input may be another movement, or one or more fingertip contacts with the touch screen device 104 in a predetermined location. If the touch screen display system 102 determines that the second touch input received meets predetermined "confirm" criteria, the critical button 1500 is activated and rendered as an "activated" critical button.

Figure 19:
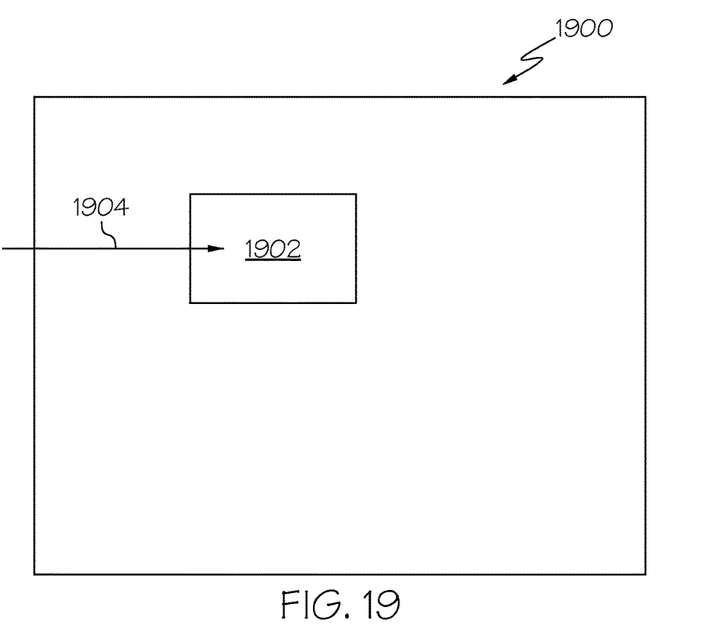
FIG. 19-FIG. 20 illustrate another sequence of designs for displaying a guarded critical button on a touch screen display system in accordance with an exemplary embodiment.
Figure 20:
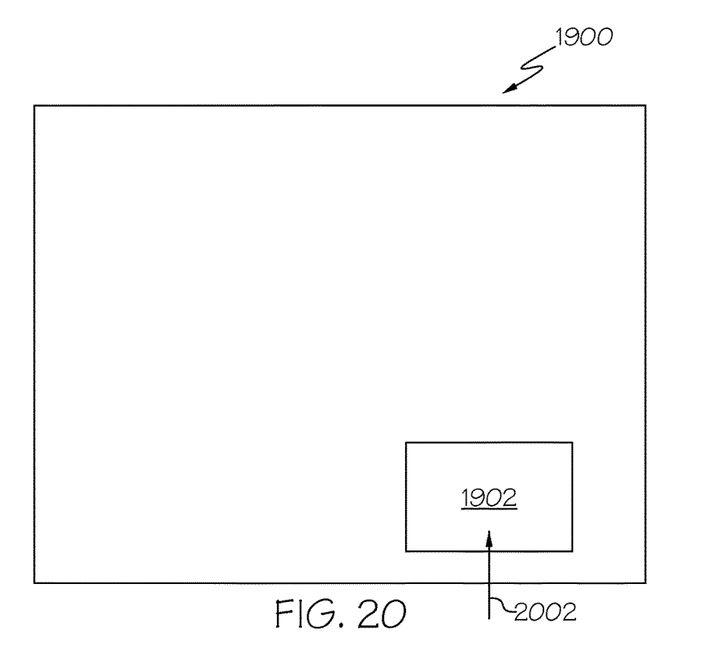

FIG. 19-FIG. 20 illustrate another sequence of designs for displaying a guarded critical button on a touch screen display system 102 in accordance with an exemplary embodiment. Critical button 1902 is rendered at a first location 1904 on touch screen display 1900. The start state design and selection criteria may be any of those herein described. In the exemplary embodiment, after a valid first touch input is received, critical button 1902 is selected, which is presented to the user in a different location and/or orientation on the touch screen device 104. For example, critical button 1902 is rendered at a second location 2002 on touch screen display 1900. Once again, in order to activate selected critical button 1902, a valid second touch input must be supplied to critical button 1902 proximate to its new location.

Figure 21:
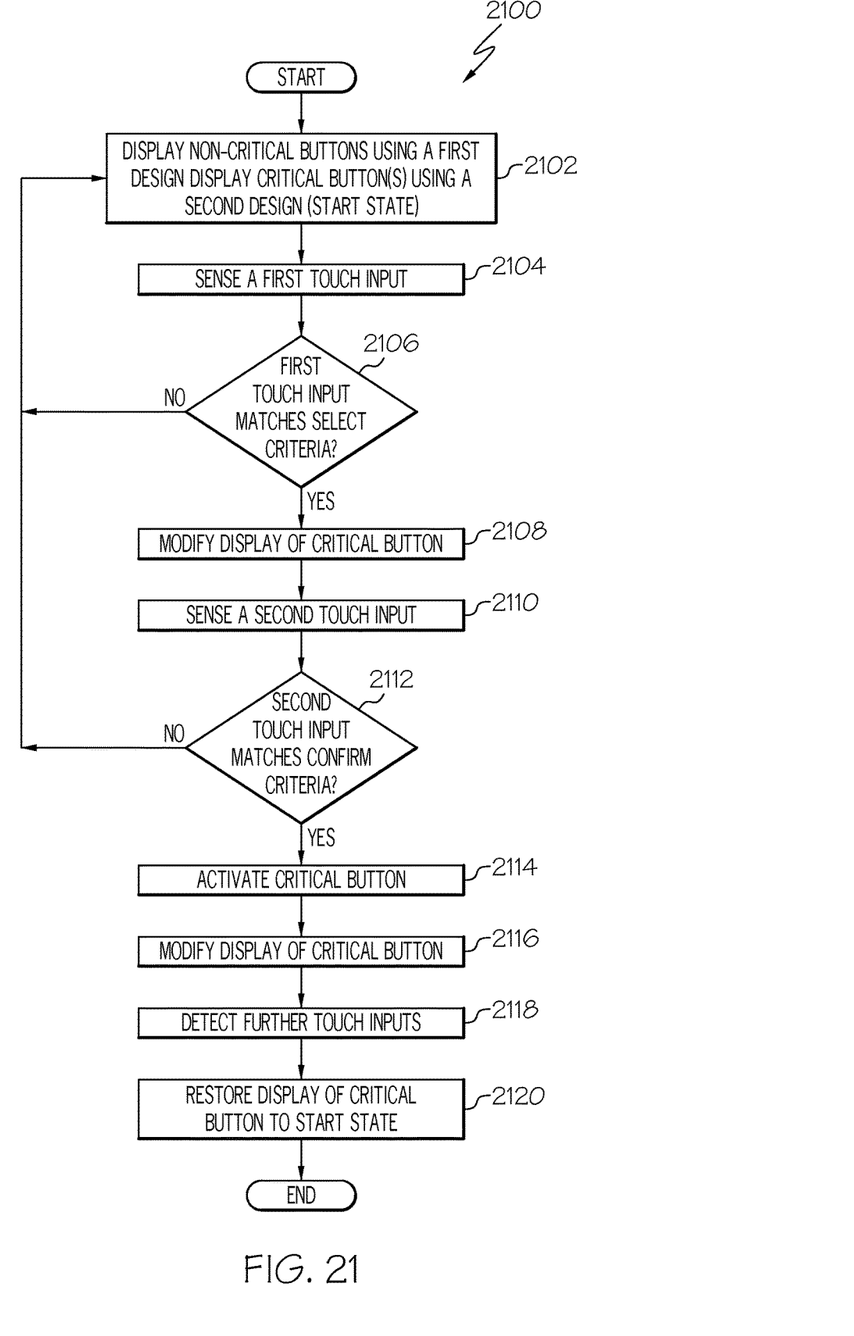
FIG. 21 is a flow chart that illustrates an exemplary embodiment of a process for displaying a guarded critical button on a touch screen display system in accordance with an exemplary embodiment.

FIG. 21 is a flow chart that illustrates an exemplary embodiment of a process 2100 for displaying a guarded critical button on a touch screen display system 102 in accordance with an exemplary embodiment. Process 2100 processes (in the touch processor 106) the various touch inputs and renders the various designs described in FIGS. 2-20. It is to be understood that additional steps may be added and/or steps may be reordered or reorganized.

At STEP 2102, buttons are displayed on the touch screen display system 102 in their start states. As previously described, designs for the display of non-critical buttons and critical buttons are typically stored as software, in database 114, and then uploaded into memory 112 in the touch screen display system 102. Database 114 also typically stores the criteria that the touch processor 106 uses for comparison in determining whether a touch input is a valid select input and whether a touch input is a valid confirm input.

The touch screen device 104 is configured to sense touch input; at STEP 2104, a first touch input is sensed. As previously described, touch input may comprise contact between one or more fingertips and the touch screen device 104 in one location or in a pattern including two or more locations, a movement or gesture made by one or more fingertips along the surface of the touch screen device 104, and/or a sequence of contacts made by fingertip touches or taps on the one or more respective locations of the touch screen device 104. Additionally, the touch input may be characterized by the duration of the contact between the one or more fingers and the touch screen device 104.

Predetermined touch input criteria are typically designed to take into account the ergonomic constraints of a user in a particular application, as well as environmental constraints, such as turbulence. The exemplary embodiment of process 2100 employs a two-step process for validating an activation request, and the first touch input criteria may vary from the second touch input criteria in reflection of the application.

For example, the first touch input may be a sequence of two taps or contacts by one fingertip on one predetermined location, and the second touch input may be a single tap or contact by two or more fingertips in a predetermined pattern on the touch screen device 104.

The touch processor 106 is coupled to the touch screen device 104 and compares the first touch input to predetermined "select" criteria to determine whether the first touch input is valid (i.e., whether the first touch input matches the select criteria); if there is a match, the critical button is selected and the display of the critical button is modified (STEP 2108) to a design that visually distinguishes the critical button from other buttons on the touch screen device 104 as selected. As previously described, modification of the critical button typically includes a design change in the symbolic representation of the critical button, such as, but not limited to: animation of any part of the critical button; a change in the color, style, or opacity of the border or the fill in rendering the critical button; a change in the orientation or location of the critical button on the touch screen device; aural feedback; tactile feedback such as vibration of the screen; and any mixed-mode combination of these types of feedback.

In some embodiments, the first touch may be required to continue for a duration of time during which the second touch (described below) is sensed. In other embodiments, the critical button simply highlights or becomes visually distinguishable for the duration of contact of the first touch, and may revert to its start state design immediately upon the termination of the contact of the first touch.

In some embodiments, the critical button is rendered in a start state design that looks like the mechanical button or lever that it is replacing. In these embodiments, the critical button may appear to have a protective cover over it, and when selected, may be rendered to appear to have the protective cover removed, or "flipped open." Utilizing these design styles reduce cognitive workload by providing visually intuitive, readily recognizable, touch screen representations of the critical buttons throughout the select and confirm stages of activation.

At STEP 2110, a second touch input is sensed by the touch screen device 104. The touch processor 106 compares the second touch input to the "confirm" criteria to determine whether the second touch input is valid (i.e., whether the second touch input matches the confirm criteria). In some embodiments, the absence of a valid second touch input within a predetermined amount of time will prompt process 2100 to restore a critical button to its start state, and render it on the touch screen device 104 with its associated start state design. During that predetermined amount of time, the critical button may exhibit a visually distinguishable characteristic, such as flashing, highlighting or various line, boundary or shading alterations.

A valid activation request for the critical button is received when the second touch input is determined to be valid following a valid first touch input, typically within a predetermined amount of time. The respective critical button is activated (STEP 2114) only when process 2100 determines that a valid activation request is received; in response, the display of the critical button may be modified (STEP 2116) to a predetermined design that represents an activated critical button. The above described multi-step activation process advantageously guards critical buttons from inadvertent activation. In some embodiments, such as single-use applications (for example, fire extinguishers), the critical button may only be activated once; post-activation the critical button is displayed in an intuitive manner to reflect that it is expended, for example with an "X" over it, a circle with a slash over it, or any similar manner.

Optionally, further touch inputs may be detected (STEP 2118) and processed to restore the critical button to its select state, and/or to its start state at STEP 2120. Touch input at STEP 2110, and STEP 2118 may have characteristics as defined for the touch input at STEP 2104. Accordingly, process 2100 utilizes the software models to provide relevant criteria, and touch processor 106 compares the criteria to touch input in optional steps for restoring the display of the critical button to the select state or to the start state at STEP 2120, and in the determination of whether relevant criteria is met at STEP 2112.

Thus, there has been provided a touch screen system and method that (1) renders a critical button in a visually distinguishable manner and (2) provides an intuitive multi-step activation process that effectively guards the button from unintentional activation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, executable by a processor, for displaying a plurality of buttons on a touch screen device configured to sense touch input, the method comprising:

displaying, using a first design, non-critical buttons;

displaying, using a second design that is different than the first design, a guarded critical button, wherein the second design causes the guarded critical button to appear to have an overlaid object on it;

rendering the guarded critical button as a third design that is different from the first design and different from the second design responsive to sensing a first touch input associated with the second design of the guarded critical button, wherein the third design causes the guarded critical button to appear to have the overlaid object partially removed;

sensing second touch input associated with the third design of the guarded critical button;

processing a combination of the first touch input and second touch input to determine whether a valid activation request for the guarded critical button has been received; and activating the guarded critical button only when it is determined that a valid activation request for the guarded critical button has been received.

2. The method of claim 1, wherein displaying the guarded critical button further comprises rendering the second design different from the first design in at least one of: border color, border style, fill color, fill style, location on the touch screen device, orientation on the touch screen device, shape, size, and animation.

3. The method of claim 1, wherein a fingertip comprises at least one of (1) a fingertip, appendage, (2) a stylus, and (3) a selection device, and wherein sensing a first touch input associated with the guarded critical button comprises detecting at least one of (1) contact between a fingertip and the touch screen device at a first location, (2) concurrent contact between two or more fingertips and the touch screen device in a first predetermined pattern, and (3) a first movement by a fingertip along the surface of the touch screen device.

4. The method of claim 3, wherein sensing a second touch input associated with the guarded critical button comprises detecting at least one of (1) contact between a fingertip and the touch screen device at a second location, (2) concurrent contact between two or more fingertips and the touch screen device in a second predetermined pattern, and (3) a second movement by a fingertip along the surface of the touch screen device.

5. The method of claim 4, wherein sensing a first touch input associated with the guarded critical button and a second touch input associated with the guarded critical button further comprises, for each location of contact between a fingertip and the touch screen device, detecting a sequence of contacts.

6. The method of claim 4, wherein the first touch input associated with the guarded critical button and a second touch input associated with the guarded critical button are characterized by a duration of time, and wherein processing the first touch input and the second touch input further comprises comparing the duration of time to a predetermined duration of time.

7. The method of claim 4, wherein a valid activation request comprises predetermined select criteria and predetermined confirm criteria, wherein confirm criteria is different than select criteria, and wherein the step of processing comprises:
determining whether the first touch input matches the select criteria; and
determining whether the second touch input matches the confirm criteria only when it is determined that the first touch input matches the select criteria.

8. The method of claim 3, wherein determining whether the first touch input matches the select criteria further comprises comparing one of (1) the first location on the touch screen to a first predetermined location, (2) the first pattern on the touch screen to a first predetermined pattern, and (3) the first movement on the touch screen to a first predetermined gesture.

9. The method of claim 3, wherein determining whether the second touch input matches the confirm criteria further comprises comparing one of (1) the second location on the touch screen to a second predetermined location, (2) the second pattern on the touch screen to a second predetermined pattern, and (3) the second movement on the touch screen to a second predetermined gesture.

10. The method of claim 1, wherein rendering the guarded critical button as a third design that is different from the first design and different from the second design further comprises rendering it different in at least one of: border color, border style, fill color, fill style, location on the touch screen, orientation on the touch screen, shape, size, animation, the rotation of the overlaid object, and the removal of the overlaid object.

11. The method of claim 1, wherein rendering the guarded critical button as a third design comprises rendering symbology representing the guarded critical button with a flipped-open cover.

12. The method of claim 1, wherein rendering the guarded critical button as a third design comprises generating at least one of (1) tactile feedback on the touch screen and (2) aural feedback.

13. The method of claim 1, further comprising rendering the guarded critical button as a fourth design, different from the first, second, and third designs, in response to determining that a valid activation request for the guarded critical button has been received.

14. The method of claim 13, further comprising returning the display of the guarded critical button to the third design in response to sensing an associated third touch input.

15. The method of claim 14, further comprising returning the display of the guarded critical button to the second design in response to sensing an associated fourth touch input.

16. A touch screen display system comprising:
a touch screen device configured to display a plurality of buttons and to sense touch input; and
a processor operatively coupled to the touch screen device and adapted to receive activation criteria, the processor configured to
(i) display, using a first design, non-critical buttons;
(ii) display, using a second design that is different than the first design, a guarded critical button, wherein the second design causes the guarded critical button to appear to have an overlaid object on it;
(iii) render the guarded critical button as a third design that is different from the first design and different from the second design in response to sensing a first touch input associated with the second design of the guarded critical button;
(iv) sense a second touch input associated with the third design of the guarded critical button;
(v) process a combination of the first touch input and second touch input to determine whether a valid activation request for the guarded critical button has been received; and
(vi) activate the emergency action associated with the guarded critical button only when it is determined that a valid activation request for the guarded critical button has been received.

17. The system of claim 16, wherein the processor is further configured to render the second design different from the first design in at least one of: border color, border style, fill color, fill style, location on the touch screen, orientation on the touch screen, shape, size, animation, and the addition of an overlaid object.

18. The system of claim 16, wherein activate criteria comprises select criteria and confirm criteria, and wherein the processor is further configured to:
determine whether the first touch input matches the select criteria, and
determine whether the second touch input matches the confirm criteria only if it is determined that the first touch input matches the select criteria.

* * * * *